United States Patent [19]

Lusk et al.

[11] 4,175,112

[45] Nov. 20, 1979

[54] PROCESS FOR PURIFICATION OF GASES CONTAINING ELEMENTAL SULFUR

[75] Inventors: Edwin B. Lusk, Plaquemine; Douglas C. Riley, Jr.; Joseph P. Creadh, III, both of Baton Rouge, all of La.

[73] Assignee: Stauffer Chemical Company, Westport, Conn.

[21] Appl. No.: 925,125

[22] Filed: Jul. 17, 1978

[51] Int. Cl.$^2$ ............... C01B 17/00; C01B 17/48
[52] U.S. Cl. ................... 423/242; 423/539; 423/540
[58] Field of Search ............... 423/242–244, 423/539, 539 A, 540

[56] References Cited

U.S. PATENT DOCUMENTS 3,325,248  6/1967  Fournel ................... 23/177

FOREIGN PATENT DOCUMENTS 765796   1/1957  United Kingdom ............ 423/539 A
985784   3/1965  United Kingdom ............ 423/539 A
1002584  8/1965  United Kingdom ............ 423/539 A

*Primary Examiner*—O. R. Vertiz
*Assistant Examiner*—Gregory A. Heller
*Attorney, Agent, or Firm*—Joel G. Ackerman

[57] ABSTRACT

Gases containing elemental sulfur are purified therefrom by contact with sulfur trioxide in oleum; additionally the gas may be purified by carbonaceous material. In one embodiment, shown in the drawing, the process is used to remove elemental sulfur from sulfur dioxide produced by reaction of molten sulfur (3) with sulfur trioxide. A portion of the sulfur trioxide is by-passed (6) and introduced into the overhead line (5) of the sulfur dioxide reactor (4). The gases are purified in a second reactor (11) containing a pool of oleum (10).

9 Claims, 1 Drawing Figure

PROCESS FOR PURIFICATION OF GASES CONTAINING ELEMENTAL SULFUR

BACKGROUND AND PRIOR ART OF THE INVENTION

This invention relates to the purification of gases containing elemental sulfur and optionally containing carbonaceous material.

More particularly, as will be discussed herein, this invention relates to a method for purification of sulfur dioxide containing elemental sulfur and optionally containing carbonaceous material.

One process for making sulfur dioxide is disclosed in British Pat. No. 985,784 and comprises the reaction of sulfur with sulfur trioxide in a pool of molten sulfur and highly concentrated sulfuric acid (100 to 101%). The sulfur and sulfur trioxide react below the surface of the pool at temperatures of from 120° C. to 150° C., producing sulfur dioxide. A similar process of this type is shown in U.S. Pat. No. 2,813,007 of Hall, et al. Another process for production of sulfur dioxide is shown in U.S. Pat. No. 2,539,579 of Hecker and comprises the reaction of gaseous sulfur trioxide with solid sulfur at temperatures below the melting point of sulfur, generally from about 50° C. to about 100° C. In another type of process sulfur dioxide is prepared by a gas phase reaction of sulfur and sulfur trioxide as described, for instance, in U.S. Pat. Nos. 2,156,791 of Mohr and 2,813,006 of Hayworth, et al. Still another process is that described in U.S. Pat. No. 4,053,573 of Harrer, et al., which deals with preparation of sulfur dioxide by reaction of molten sulfur with spent sulfuric acid.

In such processes, the sulfur dioxide gas produced by the reaction generally also contains elemental sulfur, as sulfur vapor and/or particles of entrained liquid or solid sulfur. In addition, if the sulfur and/or sulfuric acid utilized for the reaction contained carbonaceous impurities, such impurities may also be contained in the sulfur dioxide product gas. The presence of element sulfur (and/or carbonaceous impurities) in the sulfur dioxide gas may cause serious plugging of downstream processing and purification equipment and may result in contamination of product sulfur dioxide or other products produced from it, such as sulfuric acid.

Several techniques have been utilized or suggested in prior art operations for removing sulfur contained in the sulfur dioxide product gases. However, such techniques have either not sufficed to remove sufficient amounts of sulfur or have proven to be expensive in light of the results obtained. Alternatively such techniques may only be satisfactory for use in connection with processes which produce sulfur dioxide at rather high temperatures. For instance, British Pat. No. 985,784 discloses the scrubbing of the sulfur dioxide gas with 98% sulfuric acid. However, it has been found that such scrubbing may not be sufficient to remove all the sulfur from the product gases. U.S. Pat. No. 2,813,007 of Hall, et al. states that in order to prevent carry-over of sulfur into downstream rectification equipment an excess of sulfur trioxide must be maintained in the gas phase over the molten pool of sulfur, or sulfur trioxide must be introduced into the lower deck of the rectification section through which ascending sulfur-containing gases pass from the sulfur dioxide production reactor. In the process of U.S. Pat. No. 4,053,573 of Harrer, et al. sulfur contained in the product gases is removed by condensation. This again may not be sufficient to remove enough of the sulfur from the product gases. U.S. Pat. No. 2,813,006 of Hayworth, et al. discloses production of sulfur dioxide gas in a gas phase reaction of sulfur with sulfur trioxide. This reaction generates a product gas which contains a large amount of sulfur vapor; at column 3, line 27, it is stated that the sulfur vapor can be 17% by volume of the product gases. This sulfur vapor is removed through the by-passing of a major portion of the sulfur trioxide fed to the reactor and reacting the thus by-passed sulfur trioxide in the gas phase with the sulfur contained in the sulfur dioxide product gases, converting the sulfur to additional sulfur dioxide. Such a process requires a high temperature of at least 650° F. (343° C.) and is thus not suitable for use to purify the gases from a reactor in which sulfur trioxide or sulfuric acid is reacted with molten sulfur, which operates at lower temperatures. Attempts to operate such a gas-phase purification step at lower temperatures have been made and have resulted in incomplete conversion of the sulfur.

In addition to sulfur dioxide produced by such processes, sulfur contamination may also cause problems in handling and product purity of other gases containing elemental sulfur.

With one exception, none of the above-mentioned patents discloses means for removing carbonaceous substances which may be introduced into the sulfur dioxide production zone as impurities in one or another feed. The sole exception is, U.S. Pat. No. 4,053,573 which removes these impurities by purging from the pool of molten sulfur. However, such impurities may also be carried downstream in the sulfur dioxide product gases. Carbonaceous impurities, in general, present the same types of problems as elemental sulfur; that is, plugging of equipment and the presence of impurities in the product or products of the plant. Sulfuric acid containing substantial amounts of carbonaceous material could not readily be disposed of as a product; it would either be recycled to the main process (if possible) or be treated as sludge.

The inability to remove carbonaceous impurities from sulfur dioxide process streams also prohibits the use of impure sulfur, e.g. "dark" sulfur as a feed to the process; only purified sulfur is acceptable.

The present invention provides a method for removal of elemental sulfur from gases, particularly gases containing primarily sulfur dioxide. It also provides an improvement in a process for production of sulfur dioxide by reaction of elemental sulfur with sulfur trioxide or sulfuric acid, in which the product sulfur dioxide gases can be purified from elemental sulfur contained therein. It further provides a method for removing carbonaceous impurities contained in gases, particularly gases containing primarily sulfur dioxide, and more particularly gases produced by the reaction of sulfur with sulfur trioxide or sulfuric acid in which carbonaceous impurities are contained in one or more of the reactants.

SUMMARY OF THE INVENTION

In brief, this invention comprises a process for purification of a gas containing as an impurity elemental sulfur, comprising contacting the gas with gaseous sulfur trioxide in a pool of oleum maintained at a temperature of from about 180° F. to about 250° F. (82°–121° C.)

DESCRIPTION OF THE DRAWING

The drawing or FIGURE represents a flow sheet of one embodiment of the process as used in connection with the production of sulfur dioxide.

DETAILED DESCRIPTION OF THE INVENTION

Figure 1:
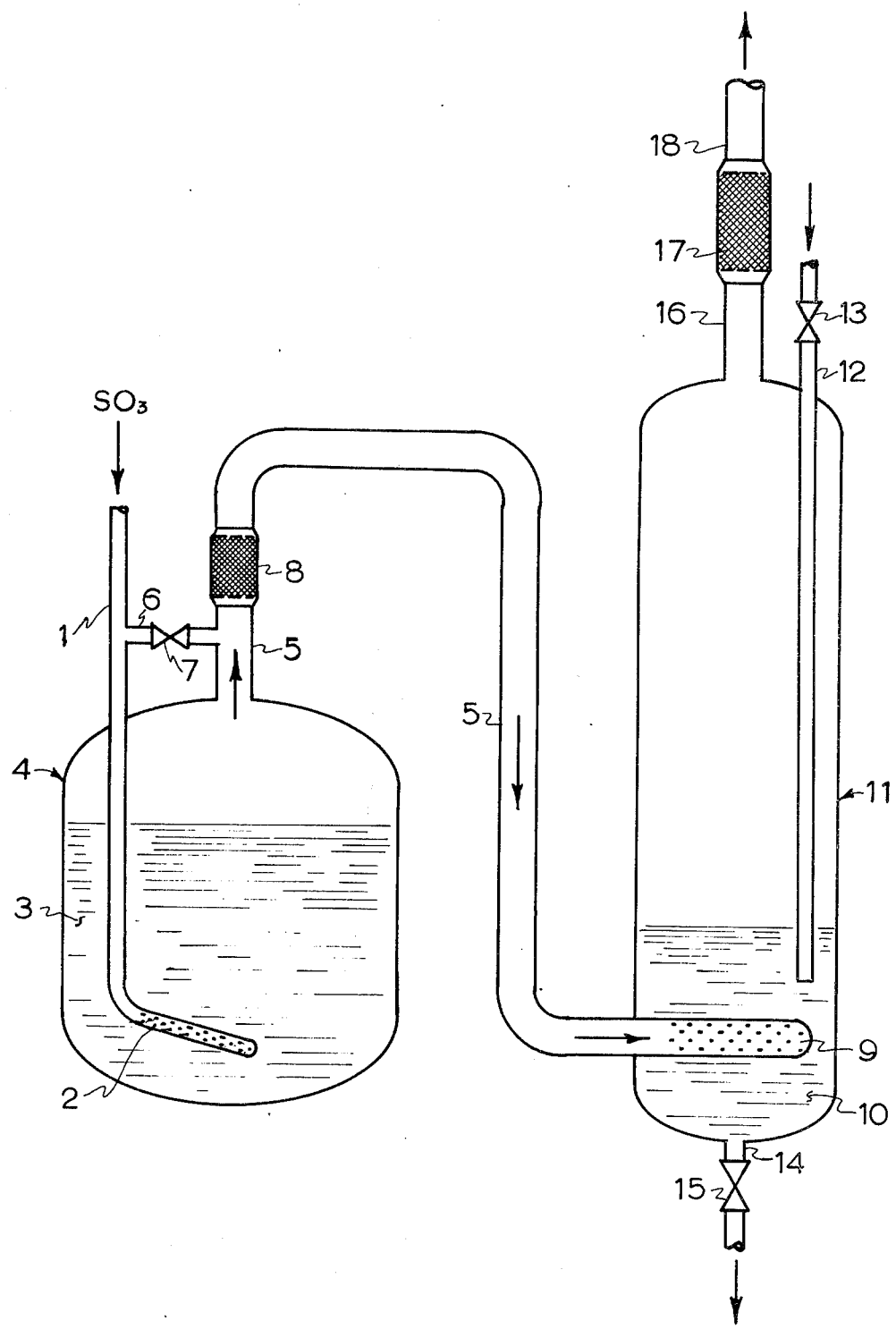

For the purpose of convenience this invention will be described with reference to the process shown in the Figure, a conventional process for preparation of sulfur dioxide by reaction of sulfur trioxide with molten sulfur in a reactor. However, as mentioned, this invention may be used for removal of sulfur from various gases, and from sulfur dioxide gases produced by other means such as the processes described in the patents mentioned earlier in this Application.

With reference to the Figure, gaseous sulfur trioxide is introduced by a line 1 and sparger 2 below the surface of a pool of molten sulfur 3 which is contained within reactor 4. As described in the prior art, the sulfur trioxide and sulfur react producing sulfur dioxide. The product gases, containing primarily sulfur dioxide, perhaps some unreacted sulfur trioxide, and unreacted elemental sulfur, generally in the vapor form or as entrained particles, are removed from reactor 4 in overhead line 5. If, as may often be the case, the sulfur utilized in the reactor contained carbonaceous impurities, some of these impurities may also be carried out with the product gases in overhead line 5. The gases are then passed through a demister 8. In general, in the prior art processes, the gases might then be passed to a gas phase reactor in which sulfur trioxide were added to react with the entrained sulfur in the gas phase and produce additional sulfur dioxide while at the same time removing the sulfur impurity. This would be followed by passage through a sulfuric acid scrubber to remove additional impurities before being further processed.

According to the process of this invention, sulfur trioxide is added to the gases exiting reactor 4 via line 5. The sulfur trioxide may be added to the gases at any convenient point in line 5 and may be supplied from the main sulfur trioxide source or from any other convenient source of sulfur trioxide. One method of adding the sulfur trioxide is shown in the Figure: a take-off line 6 is provided in the main sulfur trioxide supply line 1. The take-off line 6 is equipped with a valve 7 which may be used to by-pass a portion of the sulfur trioxide in line 1 around the reactor and into the gas in overhead line 5. The gases in line 5, now containing sulfur dioxide, elemental sulfur and the added sulfur trioxide are introduced into sparger 9 below the surface of a pool of oleum 10 contained in purification reactor 11. Preferably, as shown in the Figure, the sulfur trioxide gas is added to the sulfur dioxide prior to introduction of the two gases into the pool of oleum, in order to provide better mixing. However, the sulfur trioxide may also be added separately to the pool of oleum by use of another inlet (not shown). Reactor 11 is equipped with an oleum inlet 12 and a drain 14, both of which are suitably equipped with valves 13 and 15 respectively.

In purification reactor 11 the elemental sulfur reacts with the added sulfur trioxide in the presence of the oleum to produce additional sulfur dioxide. The product gases are removed in overhead line 16, passed through a demister 17 and taken off in line 18 for further processing by conventional means.

In general, the pool of oleum is maintained at a temperature of from about 180° F. (82° C.) to about 250° F. (121° C.) The temperature at which the oleum is maintained is related in part to the rate of operation (with respect to design flow rates of materials) of the process. The oleum is maintained at a strength of at least 100.1% equivalent sulfuric acid, preferably about 100.5–108%; however, in general, a strength of about 101–103% is sufficient for most operations. The oleum is maintained at a proper strength by the addition of the sulfur trioxide in line 5. At lower rates of operation, the oleum temperature will be at a lower point in the desired range, generally from about 180°–200° F. (82°–93° C.) and the strength will be at a higher value due to the greater retention of sulfur trioxide in the oleum. At higher rates of operation the oleum temperatures will generally be in the range of 200°–250° F. (93°–121° C.), preferably about 220°–245° F. (104°–118° C.) and the oleum acid strength will lie towards the lower end of its range due to the more rapid loss of sulfur trioxide by vaporization.

The sulfur trioxide addition into line 5 and thence into purification reactor 11 is controlled so as to maintain the desired acid strength of the oleum, and may be conveniently controlled by analysis of the oleum and adjustment of the sulfur trioxide addition, either manually or automatically, in response to the acid strength of the oleum. When bypassing feed sulfur trioxide through line 6 in the embodiment shown in the Figure, it is usually sufficient to by-pass about 0.5–1% of the total feed. Close control of the sulfur trioxide is not necessary; the major limitation on sulfur trioxide content is the capacity of downstream scrubbers or absorbers to remove sulfur trioxide passing out of the purification reactor 11 in line 18. Generally, such equipment can control up to about 0.4–0.5% sulfur trioxide in the gas streams. Consequently, in such plants, the upper limit on sulfur trioxide which could be introduced into reactor 11 would be that amount which, under the operating conditions, would produce an overhead gas in line 18 containing 0.4–0.5% sulfur trioxide. For this reason, the sulfur trioxide addition could also be controlled in response to the sulfur trioxide concentration in the overhead gases leaving reactor 11, measured at any appropriate point.

The gases entering the purification reactor 11 should be at a temperature of at least the freezing point of sulfur (about 235° F. or 113° C.) in order to prevent the deposition of solid sulfur in the equipment (with consequent plugging problems). In general, the gases entering the reactor in line 5 may be at a temperature of about 235°–350° F. (113°–176° C.), and are preferably at a temperature of about 240°–280° F. (115°–138° C.) For this reason, when utilized in connection with the production of sulfur dioxide, this invention finds greater applicability to treatment of sulfur dioxide produced by lower temperature processes, i.e. solid or liquid phase reactions, than by higher temperature, i.e. gas phase reactions. The gases produced by the lower temperature processes would require relatively little or no heating or cooling before introduction into the purification reactor 11. On the other hand, the gaseous product of a higher temperature reaction (for example, as described in U.S. Pat. No. 2,813,006) would require substantial cooling, and although such cooling could be effected and such a gas could be purified by this process, it would generally be uneconomical.

In addition to the removal of sulfur in the purification reactor, if carbonaceous material is also present in the entering gases, it is collected in the oleum pool and can be removed by purging the pool through drain 14 while adding fresh oleum through inlet 12, which can be performed without shutting down the reactor. It has further been found that maintenance of the oleum strength at about 102–103% equivalent sulfuric acid can produce complete or nearly complete oxidation of the carbonaceous impurities, without contamination of the oleum, so as to permit continuous operation of reactor 11 with little or no purging of oleum required. The capacity for removal of carbonaceous impurities permits the use of impure sulfur or sulfuric acid as a reactant in the primary reactor 4.

Another advantage of this process, when used in connection with sulfur dioxide production, is that it also possesses the capacity to act as a trap and contain spillovers or boil-overs from the primary reactor (due, e.g. to temporary over heating) without these affecting downstream operations.

While this process has been described in terms of purification of sulfur dioxide-containing gases, it is not limited to such operations, but is applicable to the treatment of any gas which contains elemental sulfur and optionally carbonaceous matter, and which will not react with sulfur trioxide or oleum under the conditions employed. For instance, this process may be used to remove sulfur from gases containing sulfur dioxide, sulfur trioxide, oxygen, nitrogen or carbon dioxide. All gases should preferably be dry before purification to prevent dilution of the oluem strength because of the presence of water.

The following example serves to further illustrate the process of the present invention.

EXAMPLE

A purification reactor of the type shown as 11 in the Figure was installed in a plant producing 75 tons per day of sulfur dioxide gas by reaction of sulfur trioxide with molten sulfur at temperatures of 270°–315° F. (132°–157° C.) A product stream containing 99.9% sulfur dioxide and approximately 200 ppm elemental sulfur was removed from the primary reactor in line 5. About 0.5% of the sulfur trioxide feed was by-passed through line 6 and added to the gaseous products of reactor 5. The purification reactor 11 was filled to a height about 3 feet (0.91 m.) above the spargers 9 with oleum having an initial strength of 107.65% sulfuric acid. The mixed gases containing sulfur dioxide, sulfur trioxide and sulfur, together with carbonaceous matter, were sparged through sparger 9 into the pool 10 of oleum for a period of 21 days. The strength of the oleum varied according to the amount of sulfur trioxide contained in the incoming gases and was between 101.3 and 107.65. After 6 days of operation the oleum height was lowered to 1.5 feet (0.46 m.) above the spargers. The temperature of the reactor varied with the rate of operation of the process. When the process was operating at maximum flow rates, the temperature in purification reactor 11 was between about 204° F. and about 222° F. (95.5°–105.5° C.) At lower rates of operation the temperature in this reactor was between about 180° F. and about 200° F. (82°–93° C.) The gases leaving the purification reactor through line 16 were passed to an absorber and contacted with 98% sulfuric acid. In operations not using this purification system, the acid discharged from the absorber appeared cloudy and was found to contain elemental sulfur. When the purification reactor 11 was utilized in this Example, the acid discharged from the absorber appeared to be as clear as the acid supplied to it.

The oleum in purification reactor 11 was examined and found to contain carbon and ash. The gases leaving reactor 11 did not appear to contain carbonaceous matter.

What is claimed is:

1. A process for the purification of a sulfur dioxide containing gas containing as an impurity elemental sulfur comprising:
    (a) contacting the gas with sulfur trioxide and
    (b) introducing the gas now containing sulfur trioxide into a pool of oleum having an acidity of about 101% to about 108% maintained at a temperature of from about 180° F. to about 250° F. whereby elemental sulfur contained in the gas is converted into additional sulfur dioxide.

2. A process according to claim 1 in which the gas to be purified additionally contains as an impurity, carbonaceous matter.

3. A process according to claim 1 in which the temperature of the oleum is from about 220° F. to about 245° F.

4. A process according to claim 1 in which the oleum is maintained at an acid strength of from about 101 to about 103% equivalent sulfuric acid.

5. A process according to claim 1 further comprising determining the acid strength of the oleum and controlling the amount of sulfur trioxide utilized in the reaction so as to maintain the oleum at a predetermined acid strength.

6. A process according to claim 1 in which the gas after purification contains unreacted sulfur trioxide and further comprising determining the concentration of sulfur trioxide in the gas after purification and controlling the amount of sulfur trioxide utilized in the reaction so as to maintain a maximum sulfur trioxide concentration in the purified gas of 0.4–0.5%.

7. A process according to claim 1 in which the gas to be purified is at a temperature of about 235°–350° F.

8. In a process for production of sulfur dioxide by reaction of sulfur trioxide or sulfuric acid with elemental sulfur whereby a gas is produced comprising sulfur dioxide and containing minor amounts of elemental sulfur, the improvement comprising contacting the sulfur dioxide-containing gas thus produced with sulfur trioxide and introducing the gas now containing sulfur trioxide into a pool of oleum having an acidity of from about 101% to about 108% maintained at a temperature of from about 180° F. to about 250° F., whereby elemental sulfur contained in the gas is converted into additional sulfur dioxide.

9. A process according to claim 8 in which carbonaceous matter contained in the gas is also removed therefrom.

* * * * *